US011348492B1

(12) United States Patent
Hoinowski

(10) Patent No.: US 11,348,492 B1
(45) Date of Patent: May 31, 2022

(54) PORTABLE ILLUMINATED SIGN WITH SOLAR PANELS

(71) Applicant: Clifford Hoinowski, Neshanic Station, NJ (US)

(72) Inventor: Clifford Hoinowski, Neshanic Station, NJ (US)

(*) Notice: Subject to any disclaimer, the term of this patent is extended or adjusted under 35 U.S.C. 154(b) by 0 days.

(21) Appl. No.: 17/091,929

(22) Filed: Nov. 6, 2020

(51) Int. Cl.
| | |
|---|---|
| *G09F 13/04* | (2006.01) |
| *G09F 13/22* | (2006.01) |
| *F21V 31/00* | (2006.01) |
| *F21S 9/03* | (2006.01) |
| *F21V 23/02* | (2006.01) |
| *F21V 21/00* | (2006.01) |
| *H02S 20/30* | (2014.01) |
| *H02S 40/32* | (2014.01) |
| *H02S 40/38* | (2014.01) |
| *H02J 7/35* | (2006.01) |
| *H02J 7/00* | (2006.01) |
| *H02S 30/10* | (2014.01) |
| *F21Y 115/10* | (2016.01) |

(52) U.S. Cl.
CPC ............... *G09F 13/22* (2013.01); *F21S 9/035* (2013.01); *F21V 21/00* (2013.01); *F21V 23/02* (2013.01); *F21V 31/005* (2013.01); *H02J 7/0047* (2013.01); *H02J 7/35* (2013.01); *H02S 20/30* (2014.12); *H02S 30/10* (2014.12); *H02S 40/32* (2014.12); *H02S 40/38* (2014.12); *F21Y 2115/10* (2016.08); *G09F 2013/222* (2013.01)

(58) Field of Classification Search
CPC ............... G09F 13/04; G09F 2013/222; G09F 13/0413; G09F 13/0463; G09F 13/0495; F21S 9/035; F21S 9/037; F21L 4/00
See application file for complete search history.

(56) References Cited

U.S. PATENT DOCUMENTS

| | | | |
|---|---|---|---|
| D285,810 S | 9/1986 | Glasener | |
| 4,816,970 A * | 3/1989 | Garcia, Jr. | ............ F21S 9/035 136/291 |
| 4,903,172 A * | 2/1990 | Schoniger | ............ G09F 13/20 362/612 |

(Continued)

OTHER PUBLICATIONS

"Street Talker Solar Light", Risch [URL: https://www.hrisch.com/allproducts/street-talker-solar-light] retrieved from the Internet, Feb. 13, 2020.

(Continued)

*Primary Examiner* — Ismael Negron
(74) *Attorney, Agent, or Firm* — Myers Wolin, LLC; Harris A. Wolin

(57) ABSTRACT

A portable illuminated sign with solar panels for outdoors and indoors use comprising a front and rear frame for receiving and securing a LED light panel, placed between both frames to emit light in order to display illuminated signs consisting of text or a logo, immediately in the front and immediately behind the LED light panel, solar panels, mounted on the front and rear side of the sign at an angle ranging from 40 to 50 degrees to a horizontal line coming through a top of the base, to absorb sunlight as a source of energy, to generate electricity stored in a battery, a base, openings for a means holding together the front frame, the rear frame and the LED light panel.

20 Claims, 8 Drawing Sheets

(56) References Cited

U.S. PATENT DOCUMENTS

| | | | |
|---|---|---|---|
| 5,101,329 A * | 3/1992 | Doyle | F21S 9/037 |
| | | | 362/183 |
| 5,255,170 A * | 10/1993 | Plamp | F21S 9/037 |
| | | | 362/183 |
| D350,566 S | 9/1994 | Pearson | |
| D355,676 S | 2/1995 | Wilson | |
| D434,451 S | 11/2000 | Grimshaw | |
| D450,776 S | 11/2001 | Albrecht | |
| D463,499 S | 9/2002 | Marcos | |
| D501,889 S | 2/2005 | Harris et al. | |
| D509,543 S | 9/2005 | Hillstrom et al. | |
| D535,953 S | 1/2007 | Fujii | |
| D577,075 S | 9/2008 | Bode | |
| 7,918,577 B2 * | 4/2011 | Barker | F21S 9/03 |
| | | | 362/99 |
| D646,269 S | 10/2011 | Crick, Jr. et al. | |
| 8,459,826 B2 * | 6/2013 | Holman | G09F 13/02 |
| | | | 362/183 |
| D700,901 S | 3/2014 | Giglio et al. | |
| 9,078,536 B2 * | 7/2015 | Boettcher | G09F 13/04 |
| D748,729 S | 2/2016 | Thomaselli et al. | |
| 9,960,311 B1 * | 5/2018 | Benezra | G09F 13/04 |
| D852,273 S | 6/2019 | Lim et al. | |
| D866,666 S | 11/2019 | Ditton et al. | |
| D883,278 S | 5/2020 | Yepez et al. | |
| D888,825 S | 6/2020 | Hu | |
| 10,867,533 B2 * | 12/2020 | Laforce | G09F 13/0413 |
| 2005/0076551 A1 * | 4/2005 | Silverstone | G09F 13/04 |
| | | | 40/568 |
| 2006/0289054 A1 * | 12/2006 | Iverson | G09F 13/04 |
| | | | 136/244 |
| 2012/0206276 A1 * | 8/2012 | Cai | F21S 9/037 |
| | | | 340/907 |
| 2019/0279541 A1 * | 9/2019 | Garza | G09F 13/0413 |

OTHER PUBLICATIONS

"Solar Powered Signs", International Sign [URL www.intlsign.com/page.php?page=SolarPoweredSigns] retrieved from the Internet, Feb. 19, 2020.

"Products", Cosunsign [URL: http://en.cosunsign.com/product/products.html] retrieved from the Internet, Jun. 2, 2020.

"Projects", Cosunsign [URL: http://en.cosunsign.com/article/projects.html] retrieved from the Internet, Jun. 2, 2020.

"Manufacture", Cosunsign [URL: http://en.cosunsign.com/page/manufacture.html] retrieved from the Internet, Jun. 2, 2020.

Sidewalk signs, posted at Displays2go.com, posted on Dec. 5, 2018, site visited Oct. 22, 2020. online, available from internet: https://web.archive.org/web/20181205203118/https://www.displays2go.com/Class/Signage-1001 (Year: 2018).

* cited by examiner

PORTABLE ILLUMINATED SIGN WITH SOLAR PANELS

CROSS REFERENCE TO RELATED APPLICATION

This application claims the priority of U.S. Provisional Patent Application No. 62/933,003, filed on Nov. 8, 2019. The contents of U.S. Provisional Patent Application 62/933,003 are hereby incorporated by reference.

FIELD OF THE INVENTION

This disclosure relates generally to signs, specifically to portable illuminated signs with solar panels.

BACKGROUND

Signs are commonly used for many years for different purposes. Nowadays, corporations, companies and/or other organizations frequently use signs, mounted outside or inside of their facilities, to advertise their businesses by displaying generally their names, logos and other information pertaining to their activities. However, conventional signs are generally difficult to read when posted inside or outside facilities when it is dark.

To resolve this problem illuminated signs have been invented which allow reading the signs in conditions when no sufficient natural or artificial light is available. Most of the currently used illuminated signs are powered by the electrical grid that limits territorial use of such signs to areas where electric power is provided. Moreover, costs of electric energy provided to the illuminated sign can be substantial for the signs of large dimensions working continuously for long hours.

Newer illuminated signs try to use alternative sources of energy, for example solar energy, to power the illuminated signs, but there is still a need for improved illuminated signs powered by such renewable energy, which can operate continuously day and night inside and outside facilities. The present solution satisfies these needs.

SUMMARY

An embodiment of the present device is a portable illuminated sign with solar panels. Commonly used illuminated signs have a front and a rear frame, for receiving and securing a LED light panel which displays a sign, and the sign consisting of text or a logo to be illuminated. Further, most of the illuminated signs are powered by the electrical grid what prevents use of such signs in areas located remotely from such grid. Use of the present illuminated sign, equipped with two solar panels, allows application of the signs in the remote areas without the close access to a power grid.

One embodiment is the illuminated sign with solar panels mounted on the base of the sign, on the front and rear side under certain angle, transforming solar energy into electricity, and a battery charged by the solar panels what allows illumination of the sign during night time or in the darkness.

In some embodiments solar panels can be mounted on a different part of the sign than a base, or only on one side of the sign. Moreover, the solar panels can be installed under different angles.

Alternative embodiments are contemplated in which the angle under which solar panels are mounted on the sign are fully adjustable. In other embodiments major components of the portable illuminated sign, like both frames, a LED light panel and a base, can be molded as a one single part. In such embodiments, the front and rear frame of the sign would not have openings for a means holding both frames and LED light panel together.

In addition, the portable illuminated sign, with solar panels, can be placed on brackets for stability. If the illuminated sign shall remain for a longer period of time on a soft ground then it can be connected to the ground.

Further, the illuminated sign can comprise internal components like two waterproof foam adhesive sheets, one placed directly in the front and other located behind the light panel, a solar controller to monitor power supply to the LED light panel, an observation window, provided on the side of the base, and a lock catch to allow locking and opening the enclosure.

DETAILED DESCRIPTION OF THE PREFERRED EMBODIMENTS

Figure 1:
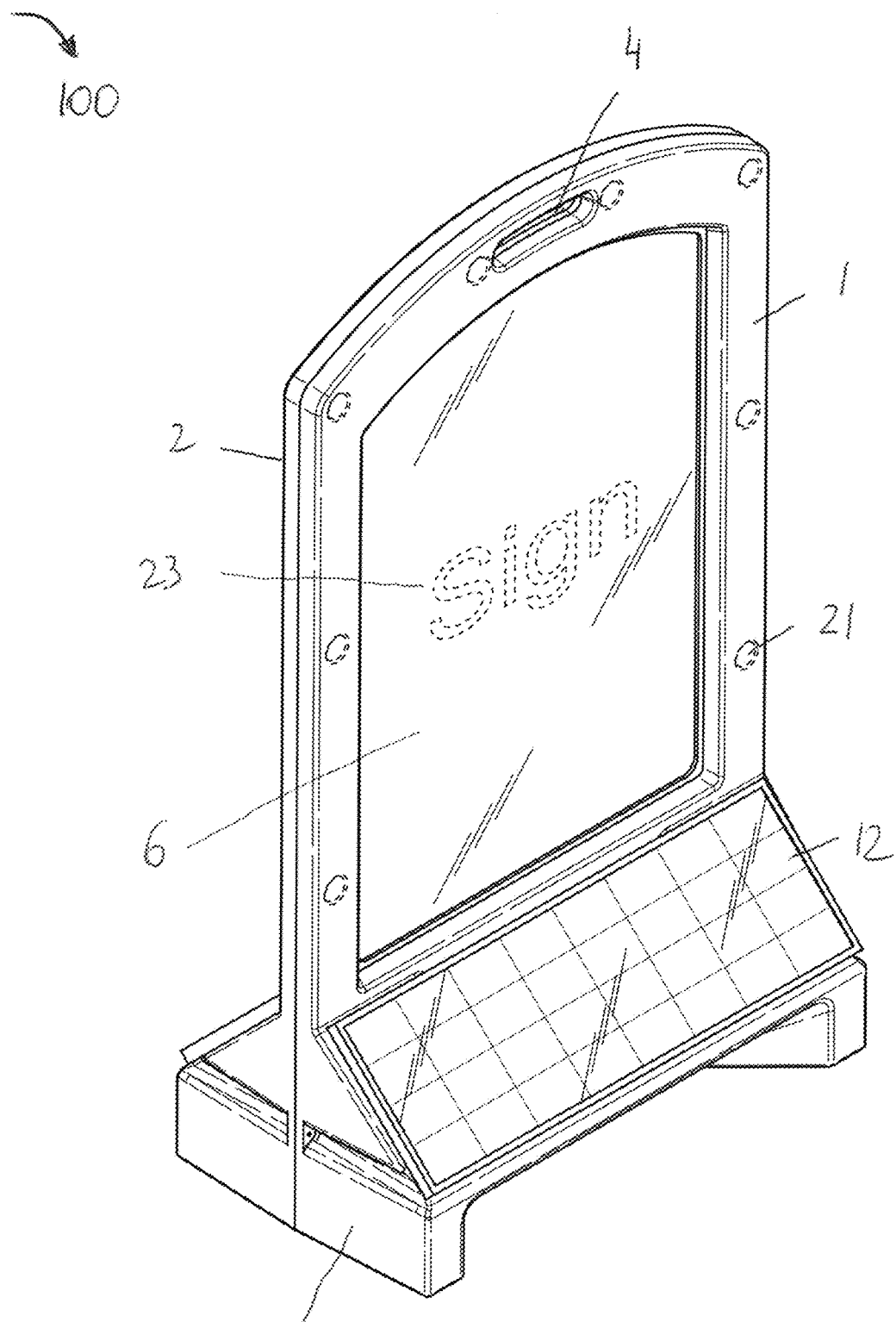
FIGS. 1-6 show a first embodiment of a portable illuminated sign with solar panels in various views in accordance with this disclosure.
Figure 2:
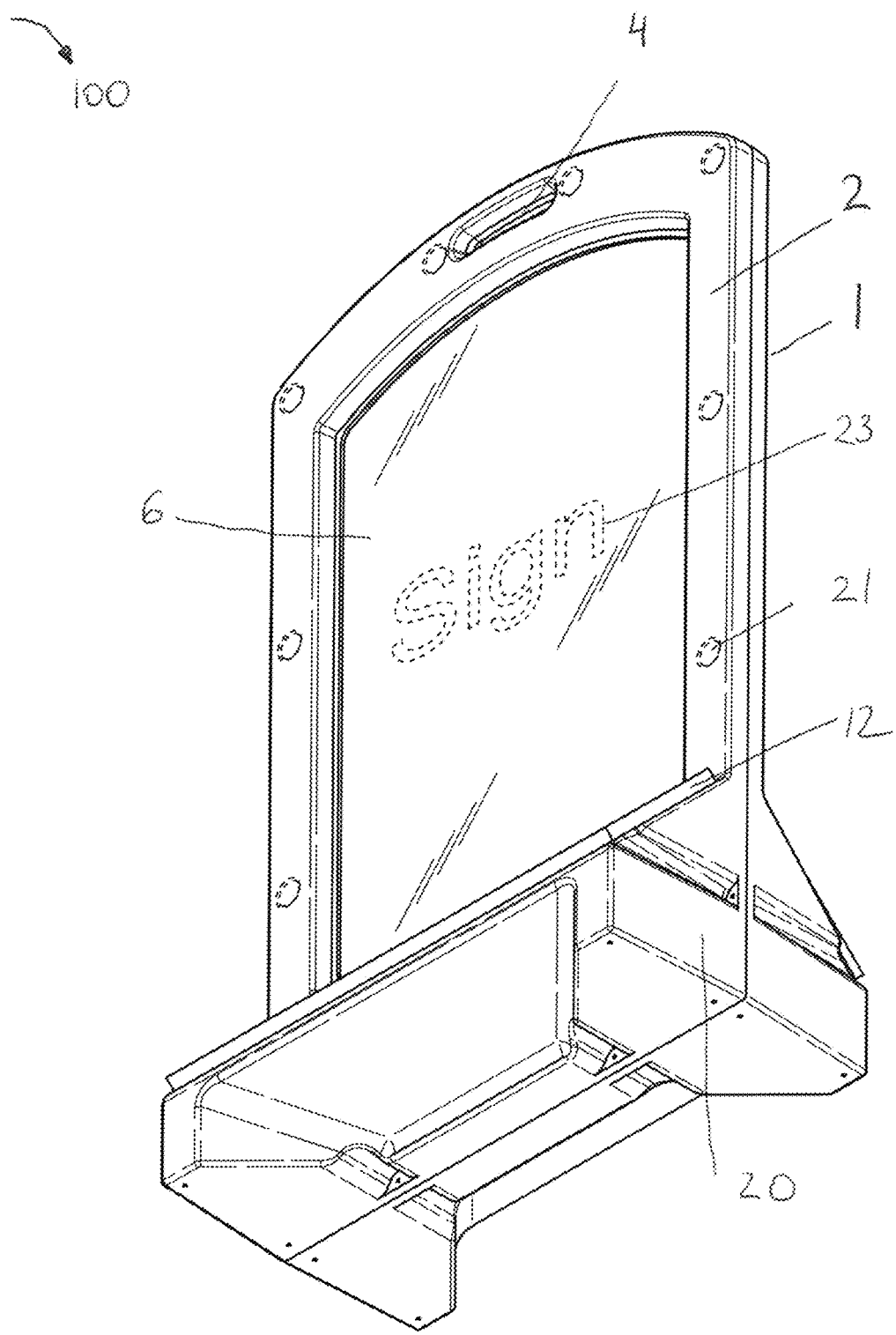
Figure 3:
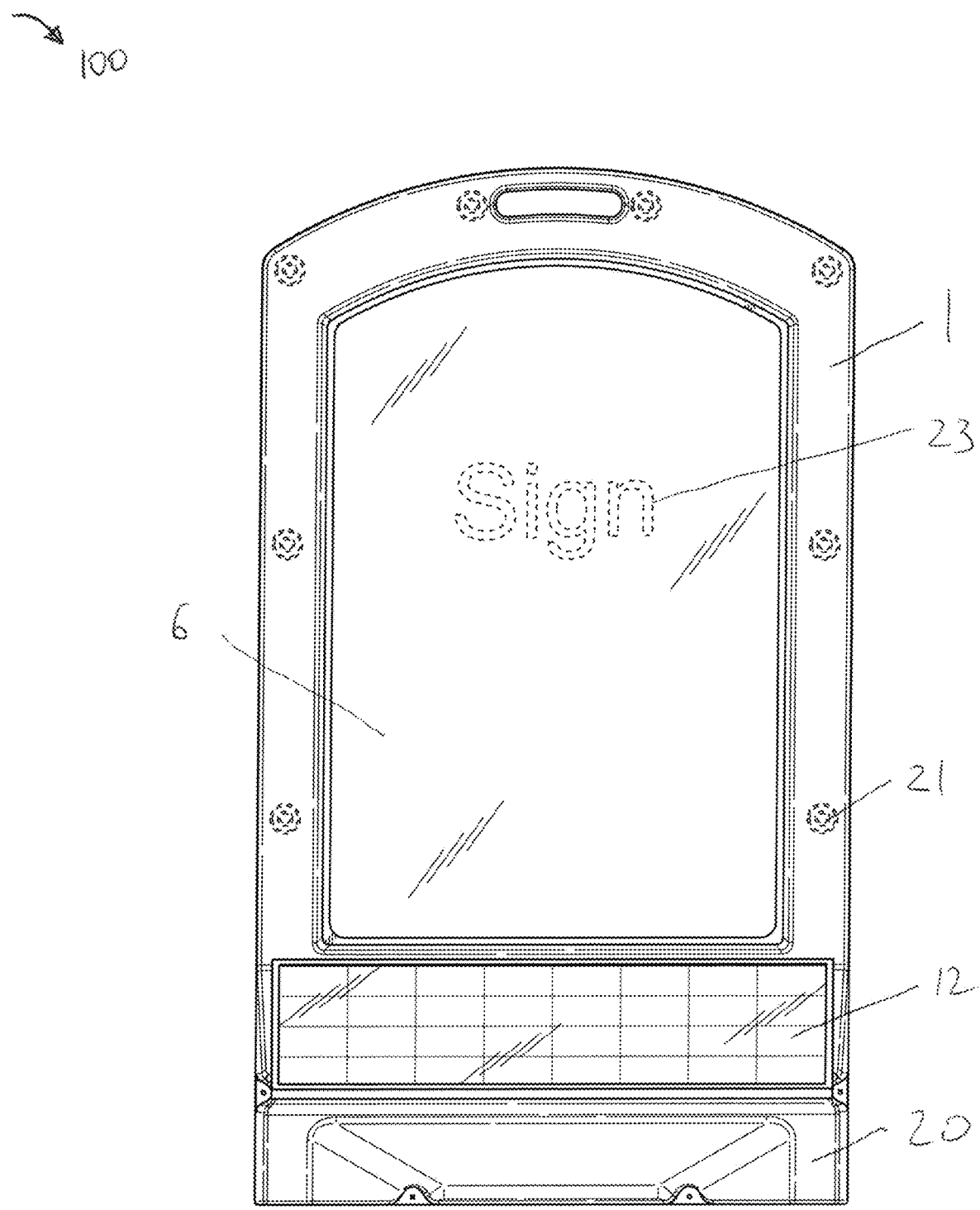
Figure 4:
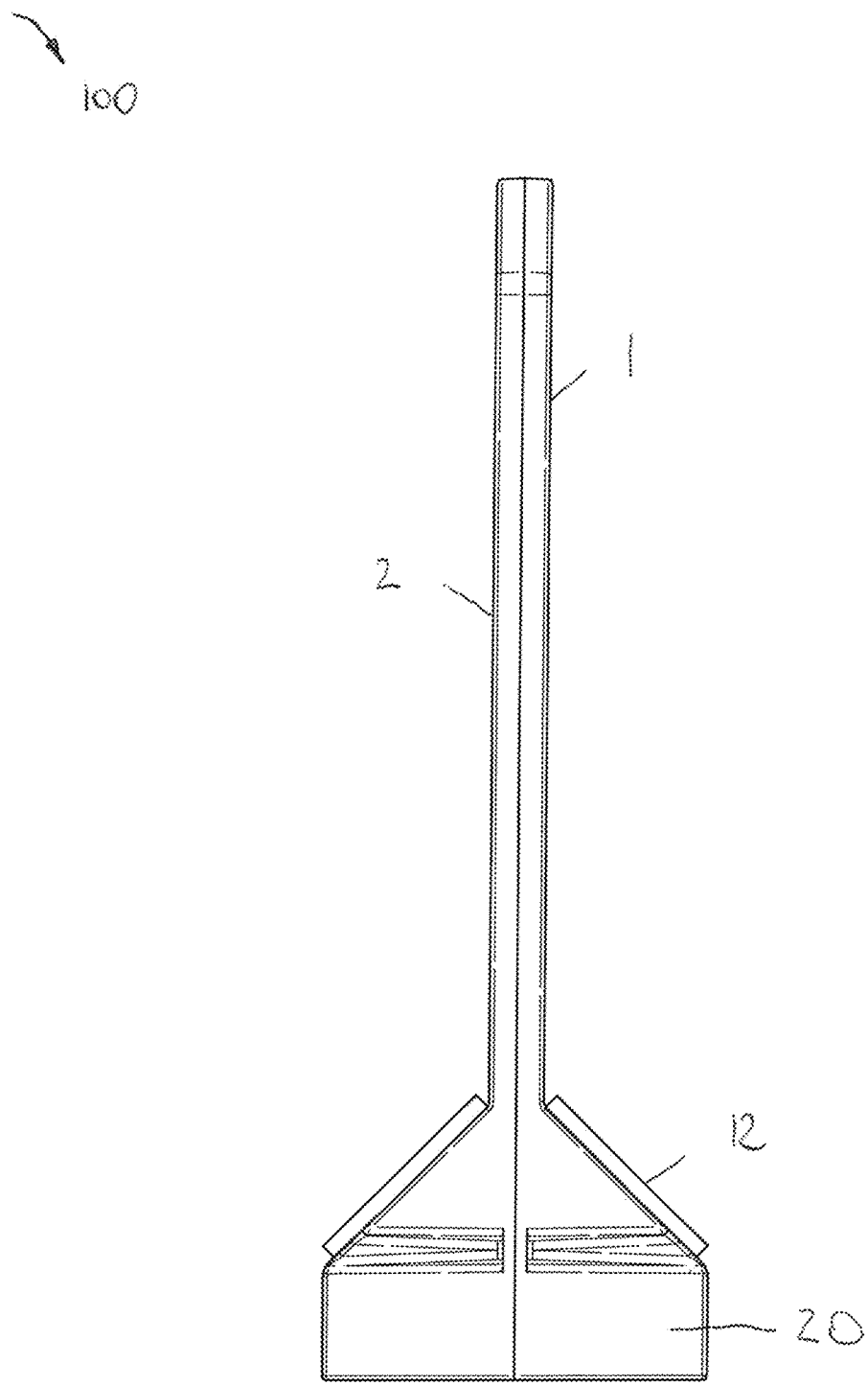
Figure 5:
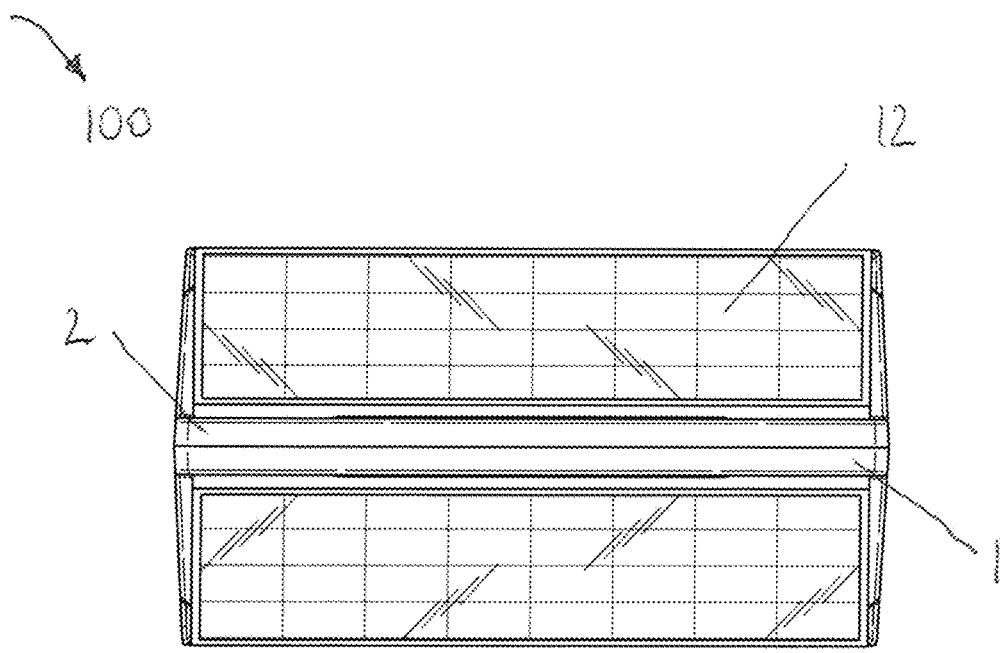
Figure 6:
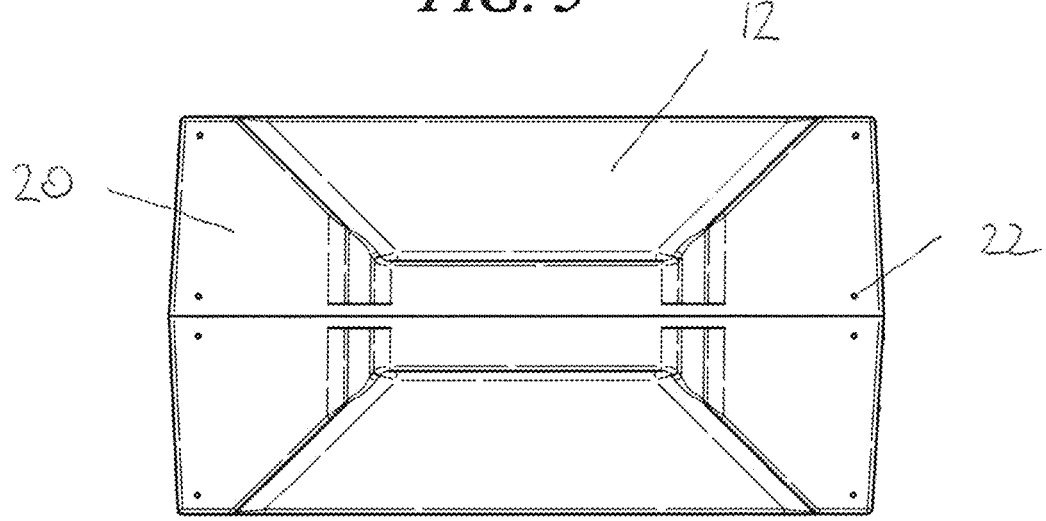

The description of illustrative embodiments according to principles of the present solution is intended to be read in connection with the accompanying drawings, which are to be considered part of the entire written description. In the description of embodiments of the solution disclosed herein, any reference to direction or orientation is merely intended for convenience of description and is not intended in any way to limit the scope of the present solution. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the solution are illustrated by reference to the exemplified embodiments. Accordingly, the solution expressly should not be limited to such exemplary embodiments illustrating some possible non-limiting combination of features that may exist alone or in other combinations of features; the scope of the solution being defined by the claims appended hereto.

This disclosure describes the best mode or modes of practicing the solution as presently contemplated. This description is not intended to be understood in a limiting sense, but provides an example of the solution presented solely for illustrative purposes by reference to the accompanying drawings to advise one of ordinary skill in the art of the advantages and construction of the solution. In the various views of the drawings, like reference characters designate like or similar parts.

The present solution relates to the portable illuminated sign with solar panels utilizing solar energy for its operation. Consequently, the illuminated sign can be placed and work at any location regardless of access to a power grid. The solar panels collect sunlight and send solar energy to a rechargeable battery of the solar controller. After gathering sufficient amount of energy from the solar panels the battery powers a LED light panel which illuminates a sign placed immediately in front and immediately behind the light panel. The battery of the solar controller sends electricity to the LED light panel having a plurality of individual LED lamps which upon activation of the panel illuminate light. Each individual LED lamp (pixel) is built up in the panel making up the length and height of the illuminated sign. While LED-powered displays are described and illustrated herein, it will be understood that other display types are contemplated such as, for example, stagnant pixel displays of the type commonly used in digital photo frames.

FIGS. 1-6 show a first embodiment of the portable illuminated sign with solar panels in various views. As shown, the illuminated sign (100) comprises a front frame (1) and a rear frame (2), for receiving and securing the LED light panel (6), placed between the front and rear frame to emit light in order to display a sign (23) consisting of text or a logo to be illuminated, placed immediately in front and immediately behind the LED light panel (6). Further the sign comprises solar panels (12) mounted on the base (20) of the sign, on the front and rear side, at an angle ranging from, for example, 40 to 50 degrees to a horizontal line coming through a top of the base (20), to absorb sunlight as a source of energy to generate electricity, openings (21) on both frames for a means, preferably stainless screws, holding together the front frame (1), the light panel (6), and the rear frame (2), and a handle waterproof sealing strip (4). The solar panels (12) charge a battery (11) during day time (not shown in FIGS. 1-6), what allows illumination of the sign during night time or in the darkness.

Figure 7:
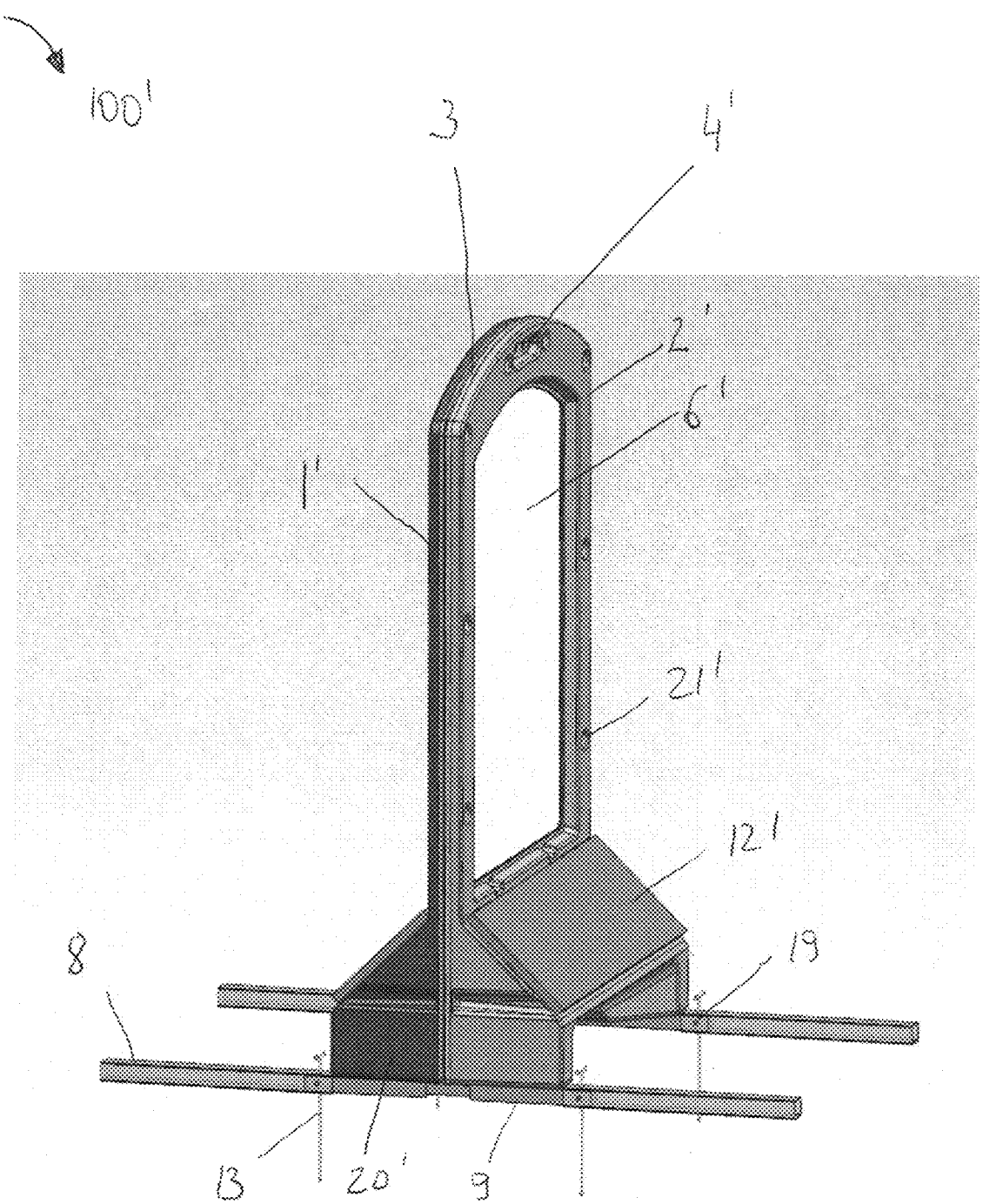
FIG. 7 shows a second embodiment of a portable illuminated sign with solar panels, placed on brackets, in accordance with this disclosure.

FIG. 7 shows a second embodiment of the portable illuminated sign with solar panels, placed on brackets for stability, in accordance with this disclosure. The sign (100') comprises the front frame (1') and the rear frame (2') for receiving and securing the LED light panel (6'), installed between the front and rear frame to emit light to display the sign consisting of text or a logo placed immediately in front and immediately behind the LED light panel (6'), solar panels (12'), mounted on the front and rear side of the sign, at an angle ranging from 40 to 50 degrees to a horizontal line coming through a top of the base (20'), for gathering an energy from sunlight, a base (20'), openings (21') for a means, preferably stainless screws, holding together the front frame (1'), the light panel (6'), and the rear frame (2'). Further, the light panel (6') comprises a waterproof sealing strip (3) and a handle waterproof sealing strip (4'). The square brackets (8) contain an opening (19) for, preferably, "T" type screws. The illuminated sign (100') can stand on "U" style brackets (9). However, to increase stability of the sign (100) the square brackets (8) are added at the ends of the "U" style brackets (9), and connected by "T" type screws (13), when the sign shall remain for a longer period of time at the same location. If the illuminated sign shall remain for a longer period of time on a soft substrate (foundation), then "T" type screws (13) can be pocketed into the ground.

Figure 8:
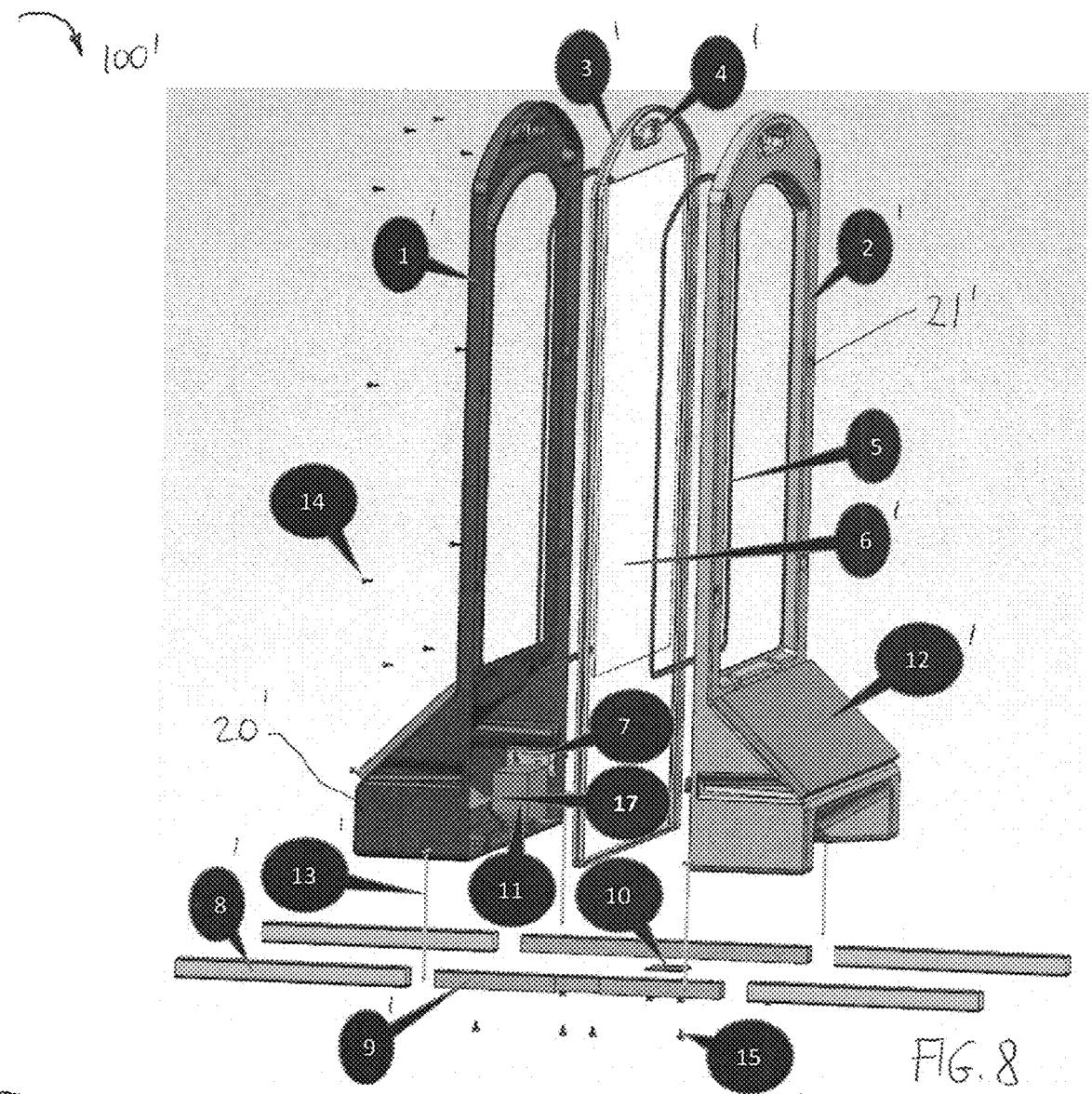
FIG. 8 shows an exploded view of the second embodiment of the portable illuminated sign with solar panels, placed on brackets, in accordance with this disclosure.

FIG. 8 shows an exploded view of the second embodiment of the portable illuminated sign with solar panels, placed on brackets. As shown, the sign (100') further includes internal components like two waterproof foam adhesive sheets (5), one placed directly in the front and other located behind the light panel (6'), the solar controller (17), located in the base (20') in the front side of the sign, to monitor power supply to the LED light panel, a rechargeable battery (11), also located in the base (20') in the front side of the sign to power the LED light panel. An observation window (7) is provided on the side of the base (20'). Further, a lock catch (10) is provided to allow locking and opening the enclosure and an access to the square brackets (8) and "U" style brackets (9). Stainless screws (14) are used, preferably "+" type, to hold together the front frame (1) and the rear frame (2), with the light panel (6). In addition, stainless screws (15) are provided, preferably "U" type, to put together all elements of the "U" style brackets.

Figure 9:
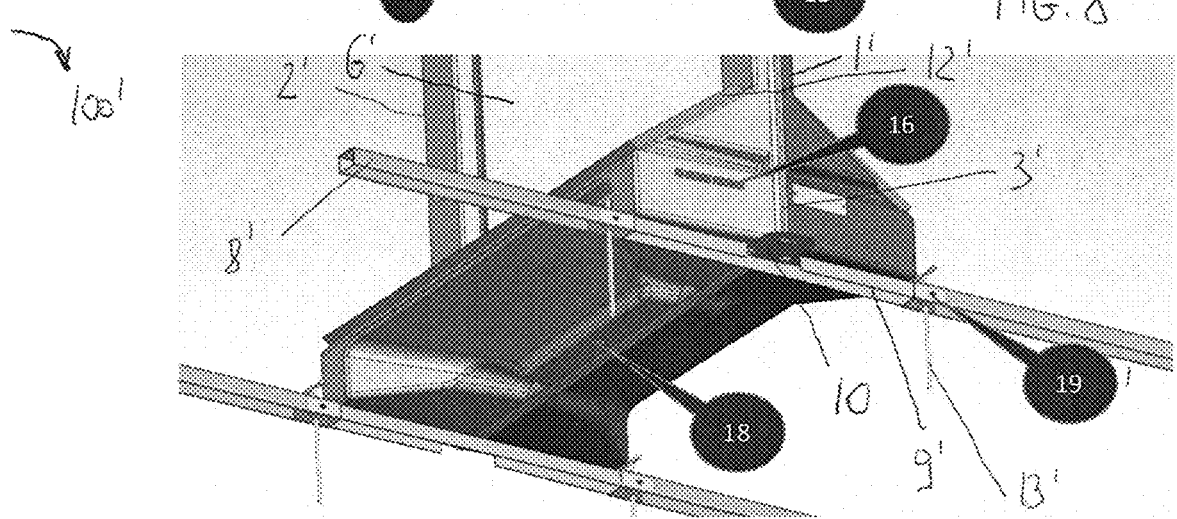
FIG. 9 shows a bottom portion of the second embodiment of the portable illuminated sign with solar panels, placed on brackets, in accordance with this disclosure.

FIG. 9 shows a bottom portion of the second embodiment of a portable illuminated sign with solar panels, placed on brackets, in accordance with this disclosure. As shown, the base of the illuminated sign (100) comprises a drain opening (18), a lock catch (10), attached to the center of the "U" style brackets (9') to allow locking and opening the enclosure and an access to the square brackets (8') and to "U" style brackets (9'). The square brackets (8) contain an opening (19) for a preferably "T" screw.

Figure 10:
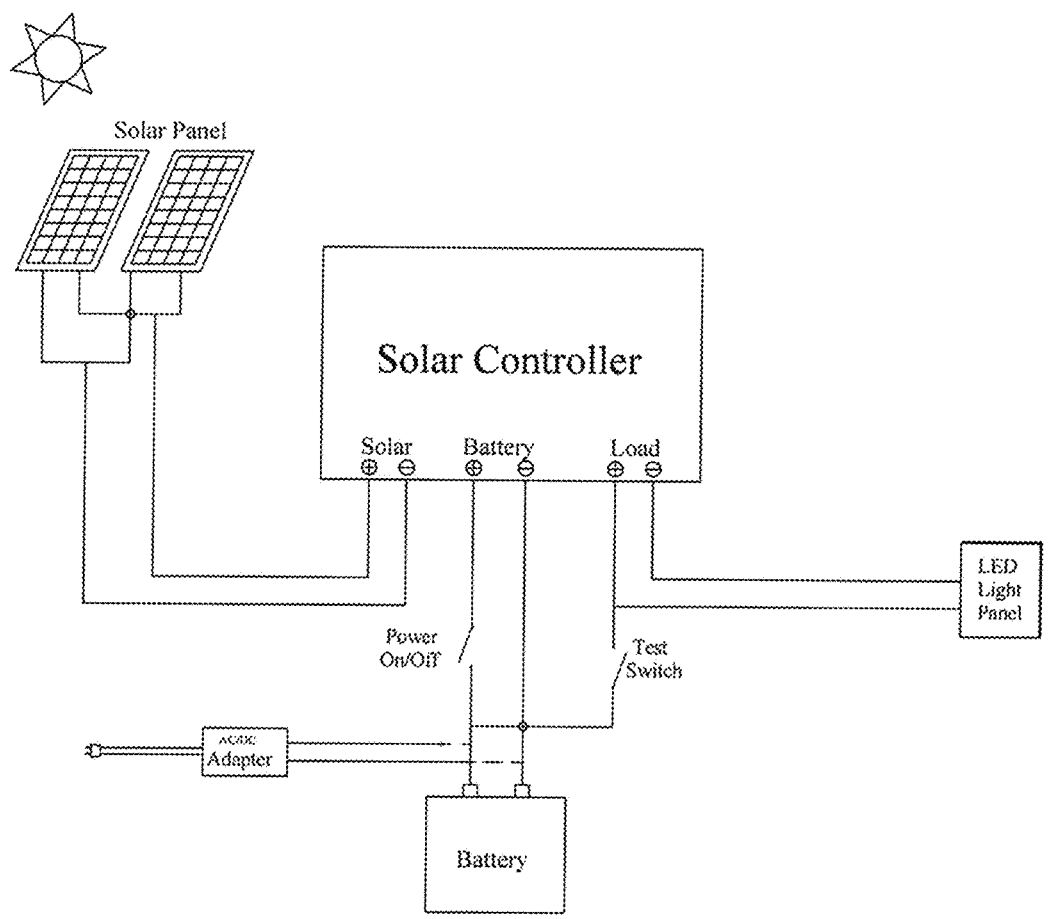
FIG. 10 shows a schematic diagram of a solar controller in accordance with this disclosure.

FIG. 10 shows a schematic diagram of a solar controller monitoring transfer of energy from two solar panels, to the rechargeable battery and next to the LED light panel. An adapter (or inverter) can be provided in the electric circuit to convert direct current (DC) into alternating current (AC) electricity.

While the present solution has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the solution. Furthermore, the foregoing describes the solution in terms of embodiments foreseen by the inventor for which an enabling description was available, notwithstanding that insubstantial modifications of the solution, not presently foreseen, may nonetheless represent equivalents thereto.

What is claimed is:

1. A portable illuminated sign comprising:
   a front frame;
   a rear frame;
   a LED light panel installed between the front and rear frame;
   a base including a planar supporting surface;
   one or more solar panels, mounted on at least one of the front and rear side of the sign, at an angle ranging from 40 to 50 degrees to the planar supporting surface; and
   a plurality of U-shaped brackets with square end portions and screws with T-shaped heads connecting the U-shaped brackets to the base.

2. The portable illuminated sign, according to claim 1, wherein the screws are configured to be embeded into a soft ground surface when the sign is provided on such surface for an extensive period of time.

3. The portable illuminated sign, according to claim 1, further comprising:
   an enclosure configured to store the U-shaped brackets and screws; and
   a lock catch configured to lock and unlock the enclosure and provide access to the square shaped brackets and screws.

4. The portable illuminated sign according to claim 1, further comprising: a battery, wherein the solar panels absorb sunlight during day time and generated electricity which is stored in the battery; to power the sign during night time or in darkness.

5. The portable illuminated sign according to claim 4, further comprising a solar controller configured to monitor transfer of energy from the solar panels to the battery and next to the LED light panel.

6. The portable illuminated sign according to claim 1, further comprising a sign placed immediately in front and immediately behind the LED light panel, wherein the LED light panel and the sign are received and secured by the front and rear frame, and light emitted by the LED light panel illuminates the sign.

7. The portable illuminated sign according to claim 6, further comprising:
   a handle;
   a first waterproof foam adhesive sheet placed directly in the front of the LED light panel;
   a second waterproof foam adhesive sheet placed directly behind the LED light panel;
   a waterproof sealing strip; and
   a handle waterproof sealing strip.

8. The portable illuminated sign according to claim 6, further comprising:
   a plurality of individual LED lamps provided in the LED light panel; and
   a battery configured to power the plurality of individual LED lamps which upon activation of the LED light panel.

9. A portable illuminated sign comprising:
   a front frame;
   a rear frame;
   a LED light panel installed between the front and rear frame;
   a base including a planar supporting surface;
   one or more solar panels, mounted on at least one of the front and rear side of the sign, at an angle ranging from 40 to 50 degrees to the planar supporting surface; and
   screws are configured to be embedded into a soft ground surface when the sign is provided on such surface for an extensive period of time.

10. The portable illuminated sign according to claim 9, further comprising: a battery, wherein the solar panels absorb sunlight during day time and generated electricity which is stored in the battery; to power the sign during night time or in darkness.

11. The portable illuminated sign according to claim 10, further comprising a solar controller configured to monitor transfer of energy from the solar panels to the battery and next to the LED light panel.

12. The portable illuminated sign according to claim 9, further comprising a sign placed immediately in front and immediately behind the LED light panel, wherein the LED light panel and the sign are received and secured by the front and rear frame, and light emitted by the LED light panel illuminates the sign.

13. The portable illuminated sign according to claim 12, further comprising:
   a handle;
   a first waterproof foam adhesive sheet placed directly in the front of the LED light panel;
   a second waterproof foam adhesive sheet placed directly behind the LED light panel;
   a waterproof sealing strip; and
   a handle waterproof sealing strip.

14. The portable illuminated sign according to claim 12, further comprising:
   a plurality of individual LED lamps provided in the LED light panel; and
   a battery configured to power the plurality of individual LED lamps upon activation of the LED light panel.

15. A portable illuminated sign comprising:
   a front frame;
   a rear frame;
   a LED light panel installed between the front and rear frame;
   a base including a planar supporting surface;
   one or more solar panels, mounted on at least one of the front and rear side of the sign, at an angle ranging from 40 to 50 degrees to the planar supporting surface; and
   an enclosure configured to store U-shaped brackets and screws; and
   a lock catch configured to lock and unlock the enclosure and provide access to the shaped brackets and screws.

16. The portable illuminated sign according to claim 15, further comprising: a battery, wherein the solar panels absorb sunlight during day time and generated electricity which is stored in the battery; to power the sign during night time or in darkness.

17. The portable illuminated sign according to claim 16, further comprising a solar controller configured to monitor transfer of energy from the solar panels to the battery and next to the LED light panel.

18. The portable illuminated sign according to claim 15, further comprising
   a sign placed immediately in front and immediately behind the LED light panel, wherein the LED light panel and the sign are received and secured by the front and rear frame, and light emitted by the LED light panel illuminates the sign.

19. The portable illuminated sign according to claim 18, further comprising:
   a handle;
   a first waterproof foam adhesive sheet placed directly in the front of the LED light panel;
   a second waterproof foam adhesive sheet placed directly behind the LED light panel;
   a waterproof sealing strip; and
   a handle waterproof sealing strip.

20. The portable illuminated sign according to claim 18, further comprising:
   a plurality of individual LED lamps provided in the LED light panel; and
   a battery configured to power the plurality of individual LED lamps upon activation of the LED light panel.

* * * * *